Figure 3:
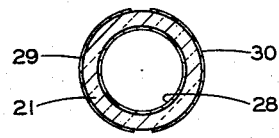

Oct. 14, 1952      A. L. W. WILLIAMS      2,614,143

ELECTROMECHANICAL TRANSDUCER

Filed June 12, 1948      2 SHEETS—SHEET 1

*INVENTOR.*
ALFRED L.W. WILLIAMS
BY
Harries A. Mumma Jr.

ATTORNEY

Oct. 14, 1952  A. L. W. WILLIAMS  2,614,143
ELECTROMECHANICAL TRANSDUCER
Filed June 12, 1948  2 SHEETS—SHEET 2
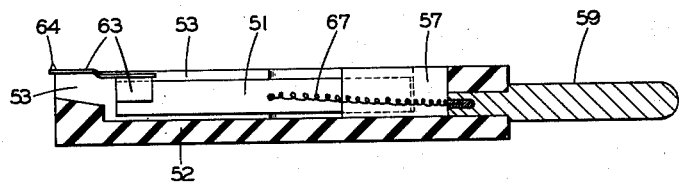
FIG. 11
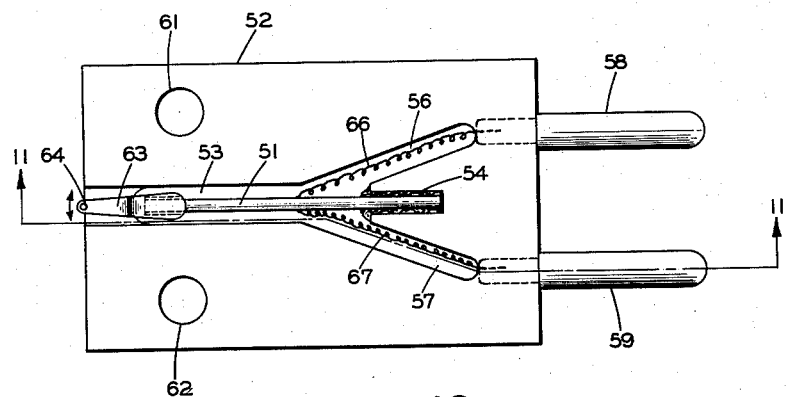
FIG. 10
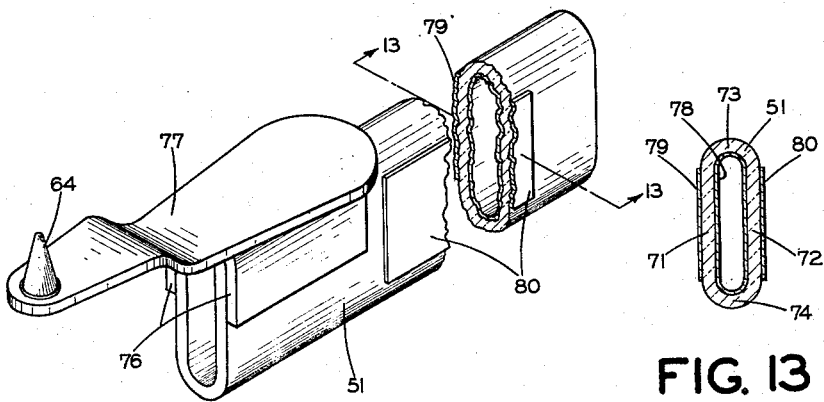
FIG. 13
FIG. 12
INVENTOR.
ALFRED L. W. WILLIAMS
BY
Harris A. Mumma Jr.
ATTORNEY Patented Oct. 14, 1952

2,614,143

UNITED STATES PATENT OFFICE 2,614,143

ELECTROMECHANICAL TRANSDUCER

Alfred L. W. Williams, Cleveland Heights, Ohio, assignor to The Brush Development Company, Cleveland, Ohio, a corporation of Ohio Application June 12, 1948, Serial No. 32,593

10 Claims. (Cl. 171—327)

This invention relates to an improved electromechanical transducer, and more particularly to such a transducer including a body of electromechanically sensitive dielectric material of a type which may be formed conveniently into hollow shapes.

In the design of transducers utilizing electromechanically sensitive material it may be desirable to employ materials sensitive to expansion and contraction. However, it has proved advantageous in many cases to employ the expander characteristics of these materials in such a way as to obtain a bending motion. To accomplish this, two electroded expander bars may be cemented together at an electroded face of each pair, forming a sandwich with a central electrode. Signal voltages applied in opposite polarities to the two bars cause one bar to expand longitudinally and the other bar simultaneously to contract. The resulting motion is a bending. Conversely, when a bending stress is applied to such a sandwich element an electrical charge appears on the electrodes.

It also has been proposed to utilize, as an electro-mechanically sensitive dielectric material sensitive to expansion, a suitably prepared polycrystalline material, particularly a titanate of one or more alkaline earth metals. Certain of these materials exhibit to a notable degree the property of developing substantial mechanical strains when subjected to electrostatic fields. In the copending application Ser. No. 740,460, filed April 9, 1947, in the name of Hans Jaffe and assigned to the same assignee as the present invention, there is described and claimed a transducer element comprising a body of dielectric material which, for example, may be a ceramic material, for example, may be a ceramically fired body of polycrystalline barium titanate. When properly polarized, such a material responds in a linear manner to the fundamental component of an alternating electrical field applied thereto. A transducer element of this material exhibits, in response to an applied electric field, an expansive or contractive motion both in the direction of the electric field and in directions transverse to the electric field. The converse electro-mechanical effects also are exhibited when forces are applied to the polarized element. A bias polarization may be induced in the material by the continuous application of an electrical biasing field, and alternatively in some circumstances a remanent bias polarization of a titanate material may be induced by the initial application of a suitable polarizing electrical field. Two or more electroded expander bars may be affixed together along electroded surfaces thereof to form bender elements, as described and claimed in the copending application Ser. No. 740,461, filed April 9, 1947, in the name of Hans Jaffe and assigned to the same assignee as the present invention, which issued October 18, 1949, as Patent No. 2,484,950.

A bender type transducer of high efficiency, utilizing electro-mechanically sensitive material of a type sensitive to expansion and contraction, has been made without the use of a sandwich type element. Such a transducer is described and claimed in the copending application Ser. No. 32,587, filed June 12, 1948, in the name of Charles K. Gravley and assigned to the same assignee as the present invention, which issued July 18, 1950, as Patent No. 2,515,446. This transducer includes a body of polycrystalline material such as a titanate material, which may be formed in shapes having curved surfaces. An elongated body of such material having a curved cross-sectional shape is stiffened mechanically by this curvature against a bending of longitudinally extending portions of the body. If forces tending to cause such a bending are applied to the body, certain of the longitudinally extending portions thereof tend to expand while certain other portions tend to contract as a result of the curved configuration, this being the reason for the stiffening effect. When these longitudinally extending portions are electroded properly, the expansive electro-mechanical property described hereinabove may be utilized for transducing between electrical and mechanical energy.

While electro-mechanical transducers of the types referred to hereinabove may be quite satisfactory in many cases, their manufacture may involve rather complicated forming, machining, and bonding operations. Various shapes of titanate material having curved surfaces are inconvenient to electrode and to polarize, and may require multiple lead connections for efficient utilization of the material. It now has been found, however, that bodies of polycrystalline dielectric material having certain hollow configurations involving curved or bent surfaces are particularly effective and easily manufactured, and may be employed advantageously in electro-mechanical transducers.

Consequently it is an object of the invention to provide a new and improved electro-mechanical transducer which substantially avoids one or more of the limitations of the prior transducers of the type described.

It is another object of the invention to provide a new and improved electro-mechanical transducer with a bender element of good efficiency and easily manufactured and assembled.

It is still another object of the invention to provide a new and improved electro-mechanical transducer utilizing an electro-mechanically sensitive dielectric material capable of being formed economically into shapes other than plates or bars.

It is a further object of the invention to provide a new and improved electro-mechanical transducer employing an efficient bending-sensitive element of non-linear cross-sectional configuration.

In accordance with the invention, an electro-mechanical transducer comprises a longitudinally extensive body of polycrystalline dielectric material of the type capable of developing substantial mechanical strains when subjected to electrostatic fields and having a wall enclosing a region which has a medial line extending generally longitudinally of the wall. The transducer includes mechanical means coupled to the body of dielectric material so that motion of the mechanical means is associated with bending of the medial line and with corresponding longitudinal contraction of one wall portion on one side of the medial line and simultaneous longitudinal expansion of another wall portion on the opposite side thereof. The transducer is provided with electrodes, adjacent the inside surface and the outside surface of these wall portions, arranged to carry charges corresponding to electrostatic signal fields in thickness directions through these wall portions with the signal fields in the same direction as an induced bias polarization in the aforesaid one wall portion but simultaneously in the opposite direction from an induced bias polarization in the aforesaid other wall portion.

For a better understanding of the present invention together with other and further objects thereof, reference is had to the following description taken in connection with the accompanying drawings, and its scope will be pointed out in the appended claims.

Figure 6:
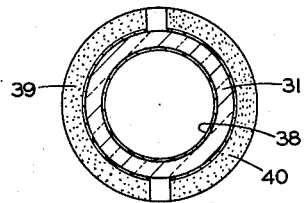
Figure 2:
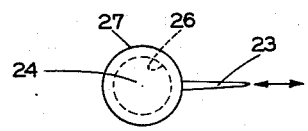
Figure 5:
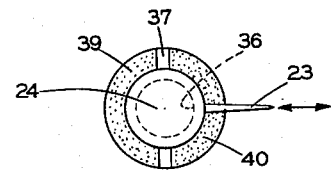
Figure 1:
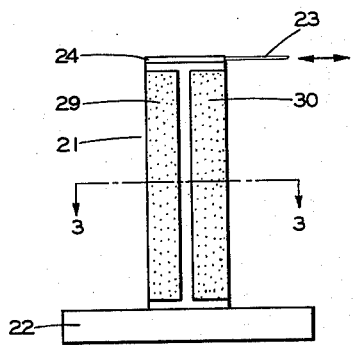
Figure 4:
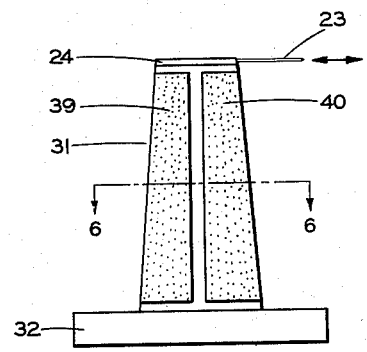
Figure 7:
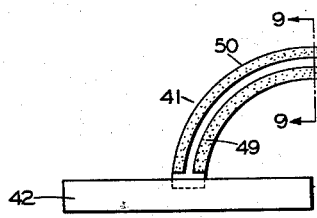
Figure 9:
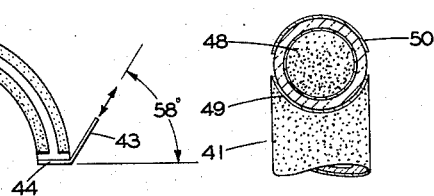
Figure 8:
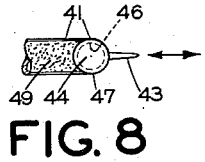

In the drawings, Figs. 1 and 2 are elevation and plan views respectively of a transducer embodying the present invention; Fig. 3 is an enlarged cross-sectional view taken at the plane 3—3 of Fig. 1; Figs. 4 and 5 are elevation and plan views respectively of a modification of the arrangement of Figs. 1 and 2; Fig. 6 is an enlarged cross-sectional view taken at the plane 6—6 of Fig. 4; Fig. 7 is a view in orthographic projection of another transducer embodying the invention; Fig. 8 is an end view of the transducer of Fig. 7; Fig. 9 is an enlarged cross-sectional view taken at the plane 9—9 of Fig. 7; Fig. 10 is a plan view of a transducer of the phonograph pickup type embodying the invention; Fig. 11 is a cross-sectional view taken in the direction 11—11 as indicated in Fig. 10; Fig. 12 is an enlarged perspective view of the electromechanically sensitive element of the Fig. 10 arrangement, with the central portion of the element broken away; and Fig. 13 is a transverse cross-sectional view of this electro-mechanically sensitive element taken in the direction indicated 13, 13 in Fig. 12.

Referring now to Figs. 1 and 2 of the drawings, there is shown an electro-mechanical transducer comprising a hollow body 21 of polycrystalline dielectric material of the type capable of developing substantial mechanical strains when subjected to electrostatic fields. Preferably this material contains barium titanate, and advantageously it comprises primarily barium titanate to which a proportion of strontium titanate may be added if desired to modify the temperature characteristics of the material, especially as regards dielectric constant, electro-mechanical coefficients, and remanent polarization. The body 21 has wall portions, as seen in Figs. 2 and 3, substantially circular in cross section and thin relative to the overall diameter of the body. The wall of the body 21 incloses or surrounds a region, that is, the region within the hollow tubular body 21, which has a theoretical medial line extending generally longitudinally of the wall portions. In the arrangement of Figs. 1 and 2 this medial line may be considered to be an axial line coextensive with the wall portions of the longitudinally extensive tube 21 and terminating at the ends of the tube.

The body 21 is affixed to a base structure 22 near one end of the medial line, which, as seen in Fig. 1, is at the bottom end of the tube. Mechanical means in the form of a shaft 23 is coupled to the body 21 near the other end of the medial line. To facilitate fastening the shaft 23 to the top of the body 21, a cap member 24 is cemented to the top of the tube and the shaft 23 is fastened firmly to this cap.

Electrode means are provided adjacent the inside surface 26 and the outside surface 27 of the body 21. The electrode means may comprise thin sheets of metal foil conductively cemented to the surfaces of the dielectric body or alternatively a conductive material consisting of small carbonaceous particles and a suitable binder. Especially in the latter case, the electrodes are so thin as to appear as a part of the surfaces to which they are applied in all except the enlarged views of the drawings. In the enlarged cross-sectional view of Fig. 3, however, an electrode 28 is seen adjacent the inside surface 26 of the tube 21. This electrode 28 may cover most or all of the inside surface 26. The electrode thickness is exaggerated in Fig. 3 for convenience of illustration. The electrode means also includes at least one electrode adjacent one of the inside and outside surfaces of the tube with the major portion of the area of this one electrode on only one side of the medial or axial line of the tube. More specifically, there are provided two such peripherally separated, longitudinally extending electrodes 29, 30 adjacent the other one of the inside and outside surfaces of the tube, specifically the outside surface 27. The electrodes 29 and 30 are oppositely disposed with respect to the axial line of the tube. It will be apparent from Figs. 1 and 3 that the electrodes 29 and 30 are separated by diametrically opposed longitudinal spaces on the surface 27 and also have margins at the top and bottom, thus preventing electrical contact on the body 21 among any of the electrodes 28, 29, and 30.

If it is desired to effect permanent polarization of the polycrystalline dielectric material of the tube 21, the outer electrodes 29 and 30 may be connected together temporarily. When a sufficient voltage is maintained for a rather short period of time between the inner electrode 28 and the outer electrodes, the dielectric material, if of the proper composition, becomes more or less permanently polarized. The bias polarization thus induced in the portion of the tube under the electrode 29 and also in the portion of the tube under the electrode 30 will be seen to be in the same radial or thickness direction relative to the medial line or axis of the tube, for example radially inward in both portions. For operation as a transducer, however, the electrodes 29 and 30 may be connected individually to the terminals of a signal source or a signal-utilization means, depending on whether the direction of electro-mechanical transducing is from electrical to mechanical energy or vice versa. The electrical terminals and the signal-supplying or signal-utilizing means are known in many conventional forms and hence are not shown in the drawings. If desired, the inner electrode 28 may be grounded, so that in operation not only is there a voltage difference between the outer electrodes 29 and 30, but they also have voltages of opposite polarity.

In describing the operation of the arrangement of Figs. 1 and 2, it may be assumed that mechanical energy is applied to the shaft 23 in a direction indicated by the double arrow. The force thus applied tends to move the upper part of the tube 21 in a leftward or rightward direction as seen in the drawings. The motion of the resulting strain causes a leftward or rightward displacement of the shaft 23, which is associated with bending of the axial line in a corresponding direction. This bending is resisted by the rigid mounting of the bottom of the tube on the base 22. It will appear from the stress distribution in the tube that, corresponding to the bending, there results a longitudinal contraction of the wall portions of the tube on one side of the axial line and simultaneous longitudinal expansion of the wall portions on the opposite side thereof. The electrodes 29 and 30 are individually disposed on the opposed portions of the outer surface 27 toward which and away from which the bending tends to displace the axis of the tube. Thus a leftward motion of the shaft 23, as seen in the drawings, causes a contraction of the wall portions adjacent the electrode 29 and simultaneous expansion of the wall portions adjacent the electrode 30. These expansive and contractive strains are distributed peripherally around the tube in such a way that the strains become negligible in the portions of the tube adjacent the areas separating the electrodes 29 and 30.

As a result of the contraction and expansion of the wall portions adjacent the electrodes 29 and 30, respectively, electric charges of opposite polarities are built up on those electrodes, across which corresponding signal voltages appear for use in a signal-utilizing means. In other words, these electric signal charges and voltages correspond to electrostatic signal fields having opposite directions at any instant, that is, radially inward in the portion of the tube under one of the outer electrodes 29 and 30 and radially outward in the portion under the other outer electrode. In the example mentioned hereinabove, however, the bias polarization is radially inward in both portions of the tube. Thus it appears that the electrodes are arranged to carry charges corresponding to signal fields in the same direction as the bias polarization in one of the wall portions but simultaneously in the opposite direction from the bias polarization in the other wall portion. The converse effect, familiar in the art of electro-mechanical transducers, also may be utilized. Thus, applying a signal voltage between the electrodes 29 and 30 causes longitudinal contraction and expansion of the individual opposed wall portions of the tube 21 and corresponding bending of the axis of the tube. The resulting motion of the shaft 23 in a direction indicated by the double arrow may be utilized in any desired manner. It is understood, of course, that the shaft 23 may be moved either leftwardly or rightwardly to produce signal voltages of corresponding polarity, and conversely that application of signal voltages of opposite polarity produces motion of the shaft 23 in opposite directions.

Figs. 4, 5, and 6 are views, corresponding to the views of Figs. 1, 2, and 3 respectively, of a modified form of the transducer which has been described hereinabove. In this modified arrangement the electro-mechanically sensitive body 31 is of circular cross-sectional shape but has a diameter which decreases progressively from the base 32 to the cap 24, to which the shaft 23 is attached. Accordingly, the inner electrode 38 on the inside surface 36 of the body 31 has the shape of the sides of a truncated cone. Similarly the two peripherally separated outer electrodes 39 and 40 have smaller peripheral dimensions toward the top of the body 31. Operation of the transducer is quite analogous to that of the transducer shown in Figs. 1–3. However, the bulkier cross section toward the bottom of the transducer, where it is mounted on the base 32, makes the body 31 stiffer and more resistant to bending at points farther removed from the mechanical coupling means 23. Since the stiffness is greater where the moment of an applied mechanical force is greater, a more uniform stress distribution is obtained with the tapered body of the arrangement of Figs. 4–6.

Figs. 7–9 show a transducer including a tube 41 of electro-mechanically sensitive material the axis of which is curved rather than straight. One end of this tube is firmly affixed to a base 42. The axis of the tube has a semicircular configuration. The free end of the tube has a cap 44 to which a shaft 43 is fastened at an angle to be discussed hereinbelow. As seen in the view of Fig. 8, showing the unmounted end of tube 41, the tube is of circular cross section and has an inside surface 46 and an outside surface 47. An inner electrode 48, shown with exaggerated thickness in the enlarged view of Fig. 9, is provided adjacent the inside surface 46, while two peripherally separated outer electrodes 49, 50 are provided analogous to the two outer electrodes in each of the arrangements of Figs. 1 and 4. The cross-sectional configuration illustrated in Fig. 9 is maintained throughout the axial length of the tube 41 except at the ends thereof, where end margins are provided for the outer electrodes.

If the body 41 is polarized suitably and a signal voltage is applied across the electrodes 49 and 50, the wall portions of the body adjacent one of the electrodes 49 and 50 contract while the wall portions adjacent the other electrode expand. The resulting motion of the tube 41 resembles that of a Bourdon tube, although the phenomenon is caused by the interaction of the contractive and expansive effects in the walls of the tube rather than by a tendency for the internal volume of the tube to change when the radius of curvature of the axis changes. For a tube 41 with a semicircular axis, mounted at one end of the tube and moving in a fairly unconstrained manner so as to change incrementally the radius of curvature of the axis, the first increments of motion of the free end of the tube are in a direction lengthwise of the shaft 43 when the shaft is fastened to the cap 44 at an angle of about 58° to the diameter through the two ends of the semicircular axis. This angle is illustrated in Fig. 7. The converse electro-mechanical effect also may be utilized by applying forces longitudinally of the shaft 43 to bend the tube from its unstressed semicircular configuration with development of signal voltages across the outer electrodes. Transducers utilizing long hollow bodies of electro-mechanically sensitive material having coiled axes, for example, a tube having walls of generally elliptical cross section with its axis in the form of a helix, are described and claimed in my copending application Ser. No. 32,594, filed June 12, 1948, and assigned to the same assignee as the present invention, which issued February 14, 1950, as Patent No. 2,497,108.

A transducer suitable for use as a phonograph pickup is illustrated in Fig. 10 and in the sectionalized view of Fig. 11. This transducer comprises an electro-mechanically sensitive element 51 of polycrystalline material mounted on a base structure 52 of insulating material. The base 52 has an elongated channel 53 with a constricted end zone 54 and two tributary channels 56, 57. The base 52 also has two connector prongs 58, 59 extending into the base to the ends of the tributary channels 56, 57 respectively. Holes 61, 62 are provided in the base for receiving screws for mounting the entire assembly. One end of the element 51 is cemented to the base structure in the constricted zone 54 of the channel 53. The other end of the element carries a yoke structure 63 to the end of which a stylus 64 is fastened. Lead wires 66, 67, laid in the channels 56, 57 respectively and connected to the prongs 58, 59 respectively, make contact with individual electrodes, described hereinbelow, on opposite sides of the element 51.

The element 51 is shown in greater detail, but with its middle portion cut away, in the perspective view of Fig. 12. As seen in the transverse cross-sectional view of Fig. 13, the element 51 is generally elliptical in cross section and has two relatively wide and flat opposed sides 71, 72 connected by two relatively narrow and rounded sides 73, 74. The end of the element 51 at the extreme right in Fig. 12 is mounted to the walls of the constricted zone 54 in the manner mentioned hereinabove. The yoke 63 is cemented to the other end of the element 51 and includes a yoke-shaped portion 76 to which is welded a thin, bent lug 77 at the end of which the stylus 64 is fastened. The inside surface of the element 51 carries an electrode 78. Between the mounted end of the element 51 and the yoke 63 are two separated outer electrodes 79, 80 adjacent the outside surface of the element and individually disposed on the opposed flat portions of that surface. Thus the electrode 79 is adjacent one of the wide sides 71 of the element, while the electrode 80 is adjacent the other wide side 72. The lead wires 66 and 67 are connected to the electrodes 79 and 80 respectively. Transducers having the features illustrated in Figs. 10-13 are described and claimed in the copending application Ser. No. 32,617, filed June 12, 1948, in the name of Thomas E. Lynch and assigned to the same assignee as the present invention.

In operation, the stylus 64 is moved laterally of the lug 77 to cause the medial line of the element 51 to bend. Motion longitudinally of the stylus 64 tends to be absorbed at the bends in the lug 77. The lateral motion is in a direction generally toward one of the flat sides 71 and 72 and away from the other of these sides, with corresponding longitudinal contraction and expansion respectively of the material in the two flat sides of the element. As with the other transducers illustrated, it is assumed that the polycrystalline material of the element 51 is polarized, at least in the flat sides thereof, in a direction normal to the inside and outside surfaces of the element. When one of the sides is forced to contract and the other to expand, voltages of opposite polarity with respect to the inner electrode 78 appear on the respective electrodes 79 and 80, resulting in a signal voltage between the last-mentioned electrodes.

Bodies of titanate material having most of the shapes illustrated in the drawings may be produced by machining blocks of ceramically fired polycrystalline material. The semicircular tubular body 41 of Fig. 7 may be produced by extruding a tubular shape and bending the extruded shape over a cylindrical surface before the firing operation. A preferred method of making long hollow bodies, such as the element 51 of the arrangement of Figs. 10-13, involves coagulating a mass of titanate raw material from a suspension thereof on a form which is burned out during the firing. This method is described and claimed in the copending application Serial No. 32,588, filed June 12, 1948, in the name of Charles K. Gravley and assigned to the same assignee as the present invention, which issued May 22, 1951, as Patent No. 2,554,327.

The titanate shapes may be electroded as required by applying to the desired surfaces thin layers of conducting materials, as known in the art. To form electrodes on the inside surfaces of the tubular shapes illustrated in the drawings, a suspension of conductive particles may be forced into the tube and dried or sintered to form conductive films on the surfaces.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electro-mechanical transducer comprising: a body of polycrystalline dielectric material of the type capable of developing substantial mechanical strains when subjected to electrostatic fields and having wall portions surrounding a region which has a medial line extending generally longitudinally of said wall portions; mechanical means coupled to said body so that motion of said means is associated with bending of said medial line and with corresponding longitudinal contraction of those of said wall portions on one side of said medial line and simultaneous longitudinal expansion of those of said wall portions on the opposite side thereof; and electrode means adjacent the inside surface and the outside surface of said wall portions, including two peripherally separated, longitudinally extending electrodes adjacent one of said inside and outside surfaces and individually disposed on the opposed portions of said one surface toward which and away from which said bending tends to displace said medial line.

2. An electro-mechanical transducer comprising: a hollow body of polycrystalline dielectric material of the type capable of developing substantial mechanical strains when subjected to electrostatic fields and having wall portions, including two relatively wide and flat opposed sides connected by two relatively narrow and rounded sides, surrounding a region which has a medial line extending generally longitudinally of said wall portions; mechanical means coupled to said body so that motion of said means is associated with bending of said medial line in a direction generally toward one of said wide sides and away from the other of said wide sides with corresponding longitudinal contraction and expansion respectively of said one and said other of said wide sides; and electrode means adjacent the inside surface and the outside surface of said hollow body, including two separated electrodes adjacent one of said inside and outside surfaces and individually disposed on the opposed portions of said one surface adjacent said one and said other of said wide sides.

3. An electro-mechanical transducer comprising: a longitudinally extensive body of polycrystalline dielectric material of the type capable of developing substantial mechanical strains when subjected to electrostatic fields and having a wall inclosing a region which has a madial line extending generally longitudinally of said wall; mechanical means coupled to said body so that motion of said means is associated with bending of said medial line and with corresponding longitudinal contraction of one wall portion on one side of said medial line and simultaneous longitudinal expansion of another wall portion on the opposite side thereof; and electrodes, adjacent the inside surface and the outside surface of said wall portions, arranged to carry charges corresponding to electrostatic signal fields in thickness directions through said wall portions with said signal fields in the same direction as an induced bias polarization in said one wall portion but simultaneously in the opposite direction from an induced bias polarization in said other wall portion.

4. An electro-mechanical transducer comprising: a longitudinally extensive body of polycrystalline titanate dielectric material of the type capable of developing substantial mechanical strains when subjected to electrostatic fields and having a wall inclosing a region which has a medial line extending generally longitudinally of said wall; mechanical means coupled to said body so that motion of said means is associated with bending of said medial line and with corresponding longitudinal contraction of one wall portion on one side of said medial line and simultaneous longitudinal expansion of another wall portion on the opposite side thereof; and electrodes, adjacent the inside surface and the outside surface of said wall portions, arranged to carry charges corresponding to electrostatic signal fields in thickness directions through said wall portions with said signal fields in the same direction as an induced bias polarization in said one wall portion but simultaneously in the opposite direction from an induced bias polarization in said other wall portion.

5. An electro-mechanical transducer comprising: a longitudinally extensive body of polycrystalline dielectric material containing barium titanate and having a wall inclosing a region which has a medial line extending generally longitudinally of said wall; mechanical means coupled to said body so that motion of said means is associated with bending of said medial line and with corresponding longitudinal contraction of one wall portion on one side of said medial line and simultaneous longitudinal expansion of another wall portion on the opposite side thereof; and electrodes, adjacent the inside surface and the outside surface of said wall portions, arranged to carry charges corresponding to electrostatic signal fields in thickness directions through said wall portions with said signal fields in the same direction as an induced bias polarization in said one wall portion but simultaneously in the opposite direction from an induced bias polarization in said other wall portion.

6. An electro-mechanical transducer comprising: a longitudinally extensive body of polycrystalline dielectric material comprising primarily barium titanate and having a wall inclosing a region which has a medial line extending generally longitudinally of said wall; mechanical means coupled to said body so that motion of said means is associated with bending of said medial line and with corresponding longitudinal contraction of one wall portion on one side of said medial line and simultaneous longitudinal expansion of another wall portion on the opposite side thereof; and electrodes, adjacent the inside surface and the outside surface of said wall portions, arranged to carry charges corresponding to electrostatic signal fields in thickness directions through said wall portions with said signal fields in the same direction as an induced bias polarization in said one wall portion but simultaneously in the opposite direction from an induced bias polarization in said other wall portion.

7. An electro-mechanical transducer comprising: a longitudinally extensive body of polycrystalline dielectric material of the type capable of developing substantial mechanical strains when subjected to electrostatic fields and having a wall generally elliptical in cross section inclosing a region which has a medial line extending generally longitudinally of said wall; mechanical means coupled to said body so that motion of said means is associated with bending of said medial line and with corresponding longitudinal contraction of one wall portion on one side of said medial line and simultaneously longitudinal expansion of another wall portion on the opposite side thereof; and electrodes, adjacent the inside surface and the outside surface of said wall portions, arranged to carry charges corresponding to electrostatic signal fields in thickness directions through said wall portions with said signal fields in the same direction as an induced bias polarization in said one wall portion but simultaneously in the opposite direction from an induced bias polarization in said other wall portion.

8. An electro-mechanical transducer comprising: a longitudinally extensive body of polycrystalline dielectric material of the type capable of developing substantial mechanical strains when subjected to electrostatic fields and having a wall, including two relatively wide and flat opposed sides connected by two relatively narrow and rounded sides, inclosing a region which has a medial line extending generally longitudinally of said wall; mechanical means coupled to said body so that motion of said means is associated with bending of said medial line in directions generally toward and away from said wide opposed sides with corresponding longitudinal contraction of one of said wide opposed sides and simultaneous longitudinal expansion of the other of said wide opposed sides; and electrodes, adjacent the inside surface and the outside surface of said wide wall sides, arranged to carry charges corresponding to electrostatic signal fields in thickness directions through said wide wall sides with said signal fields in the same direction as an induced bias polarization in one of said wide opposed sides but simultaneously in the opposite direction from an induced bias polarization in the other of said wide opposed sides.

9. An electro-mechanical transducer comprising: a longitudinally extensive body of polycrystalline titanate-type dielectric material having a wall, thin relative to the overall cross-sectional dimensions of said body, inclosing a region which has a medial line extending generally longitudinally of said wall; mechanical means coupled to said body so that motion of said means is associated with bending of said medial line and with corresponding longitudinal contraction of one wall portion on one side of said medial line and simultaneous longitudinal expansion of another wall portion on the opposite side thereof; and electrodes, adjacent the inside surface and the outside surface of said wall portions, arranged to carry charges corresponding to electrostatic signal fields in thickness directions through said wall portions with said signal fields in the same direction as an induced bias polarization in said one wall portion but simultaneously in the opposite direction from an induced bias polarization in said other wall portion.

10. An electro-mechanical transducer comprising: a longitudinally extensive body of polycrystalline titanate-type dielectric material having a wall inclosing a region which has a medial line extending generally longitudinally of said wall; mechanical means coupled to said body so that motion of said means is associated with bending of said medial line and with corresponding longitudinal contraction of the portion of said wall on one side of said medial line and simultaneous longitudinal expansion of the portion of said wall on the opposite side thereof; an electrode adjacent substantially all of the inside surface of said wall; and two peripherally separated, longitudinally extending electrodes, individually adjacent the outside surfaces of said two portions of said wall and constituting individually the two electric signal terminals during electro-mechanical transducing, said two wall portions having a substantial induced remanent polarization in the same generally radial direction relative to said medial line.

ALFRED L. W. WILLIAMS.

REFERENCES CITED

The following references are of record in the file of this patent:

UNITED STATES PATENTS

| Number | Name | Date |
|---|---|---|
| 1,746,788 | Marrison | Feb. 11, 1930 |
| 2,373,445 | Baerwald | Apr. 10, 1945 |
| 2,486,560 | Gray | Nov. 1, 1949 |
| 2,540,412 | Adler | Feb. 6, 1951 |